Patented June 5, 1934

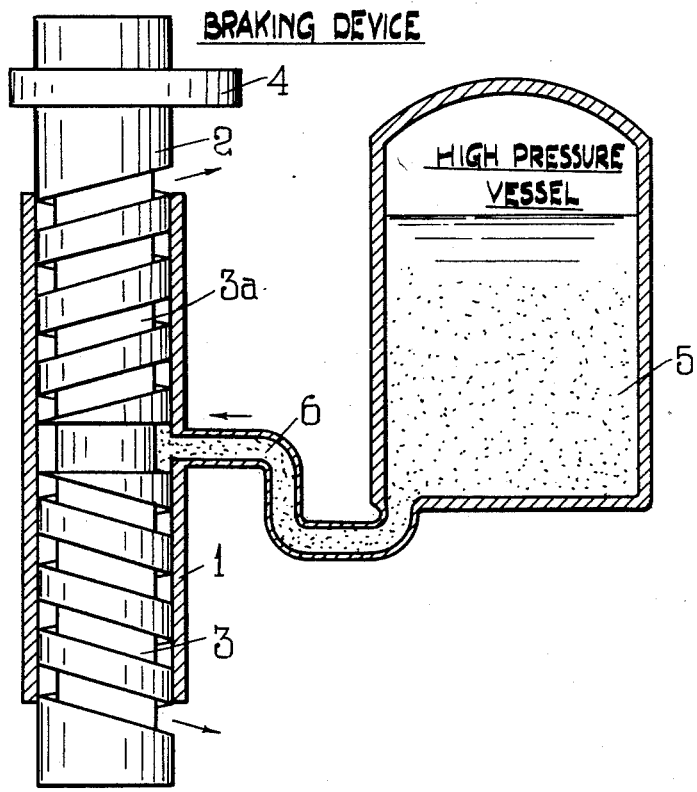

1,961,879

UNITED STATES PATENT OFFICE 1,961,879

METHOD OF RELEASING THE PRESSURE OF MIXTURES OF SOLIDS AND LIQUIDS EXISTING UNDER HIGH PRESSURE

Charles Frederick Reed Harrison and Schofield Labrow, Norton-on-Tees, England, assignors to Imperial Chemical Industries Limited, London, England, a British company Application April 19, 1930, Serial No. 445,820 In Great Britain May 4, 1929

3 Claims. (Cl. 196—53)

When it is required to release the pressure on a mixture of a solid and a liquid from vessels containing gases under high pressure and a reducing, or throttle, valve is used for this purpose, it is found that the parts of the valve exposed to the mixture rapidly become worn. A fine orifice placed in the path of the mixture serves no better, as it rapidly becomes enlarged owing to erosion. For example a valve made of hardened stainless steel became so worn as to be useless when used for 15 minutes for releasing the pressure from 120 atmospheres to 1 atmosphere on a mixture of equal quantities of powdered coal and heavy oil.

We have now found, in contradistinction to these known methods of releasing pressure in which part of the potential energy of the system is allowed to pass into kinetic energy of the particles, that the necessary condition for avoiding erosion is that part of the potential energy of the whole high-pressure system should be expanded in the performance of external work without allowing any substantial development of kinetic energy of the particles of liquid and solid. According to the invention the high-pressure material is passed at a low speed into an apparatus such as an extraction pump of any suitable and reversible type which acts as a motor, whereby the material is caused to perform external work at the same time as its pressure is released.

It is preferred to employ a valveless pump as motor, or one in which the valves are only operated in stationary or almost stationary fluids.

One type of pump suitable for carrying out the invention is the screw viscosity pump. This pump consists essentially of a cylindrical casing acting as a bearing for a shaft having upon its surface one or more spiral channels through which liquid or a mixture of solid and liquid may pass. By virtue of the viscosity of the material a considerable pressure difference between two points of the spiral is capable of existing, and by driving the shaft the material may be forced from a region of low pressure to one of high pressure. If a fluid at high-pressure be applied to the delivery side of the pump the shaft will rotate, and if the speed is regulated, e. g. by some braking system, the rate of letting down the pressure on the fluid may be controlled. The pressure of a fluid is thus released in a perfectly gradual manner and part of the potential energy of the high pressure system may thus be converted into external work.

The rate of discharge is low, being insufficient to cause turbulent motion, and the fluid has no substantial amount of kinetic energy. The energy producing the work is the pressure energy of the system, and this acts by the viscous drag of the material on the screw, thus causing rotation.

One preferred form of apparatus for carrying out the invention is shown in the accompanying drawing.

Here 5 represents a high pressure vessel connected by pipe 6 to a screw viscosity pump consisting of a casing 1 in which can rotate a shaft 2 having oppositely wound spiral channels 3 and 3a. 4 is a braking means.

We declare that what we claim is:—

1. In a process of destructive hydrogenation, releasing the pressure on a mixture of solid and liquid products of said hydrogenation by converting it into rotational energy, and absorbing said rotational energy by braking, without permitting said solid and liquid products to flow in a turbulent manner, whereby erosion is diminished.

2. In a process of destructive hydrogenation, releasing the pressure on a mixture of solid and liquid products of said hydrogenation by converting it into rotational energy, by allowing said products to flow in a non-turbulent manner through a tortuous passage and absorbing said rotational energy by braking, whereby erosion is diminished.

3. In a process of destructive hydrogenation, converting the pressure energy of the solid and liquid products of said hydrogenation in their unthrottled state into rotational energy by utilization of the phenomenon of viscous drag, and braking said rotational energy, whereby erosion is diminished.

CHARLES FREDERICK REED HARRISON.
SCHOFIELD LABROW.